(12) United States Patent
Steffes (10) Patent No.: US 12,246,648 B2
(45) Date of Patent: Mar. 11, 2025

(54) VEHICULAR EXTERIOR REARVIEW MIRROR ASSEMBLY WITH LOCKING FEATURE

(71) Applicant: Magna Mirrors of America, Inc., Holland, MI (US)

(72) Inventor: Matthew V. Steffes, Grand Rapids, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 658 days.

(21) Appl. No.: 17/648,220

(22) Filed: Jan. 18, 2022

(65) Prior Publication Data
US 2022/0227294 A1    Jul. 21, 2022

Related U.S. Application Data

(60) Provisional application No. 63/199,698, filed on Jan. 19, 2021.

(51) Int. Cl.
*B60R 1/072* (2006.01)
*G02B 7/182* (2021.01)

(52) U.S. Cl.
CPC .............. *B60R 1/072* (2013.01); *G02B 7/182* (2013.01)

(58) Field of Classification Search
CPC .......... B60R 1/072; B60R 1/078; B60R 1/07; G02B 7/182
USPC ........................................................ 359/881
See application file for complete search history.

(56) References Cited

U.S. PATENT DOCUMENTS

| | | |
|---|---|---|
| 2,839,965 A | 6/1958 | Budreck |
| 4,278,227 A | 7/1981 | Davis et al. |
| 4,422,724 A | 12/1983 | Otsuka et al. |
| 4,435,042 A | 3/1984 | Wood et al. |
| 4,436,371 A | 3/1984 | Wood et al. |
| 4,502,759 A | 3/1985 | Herzog et al. |
| 4,826,289 A | 5/1989 | Vandenbrink et al. |
| 4,948,242 A | 8/1990 | Desmond et al. |
| 5,033,835 A | 7/1991 | Platzer, Jr. |
| 5,050,977 A | 9/1991 | Platzer, Jr. |
| 5,080,492 A | 1/1992 | Platzer, Jr. |
| 5,182,676 A | 1/1993 | Iwai et al. |
| 5,327,288 A | 7/1994 | Wellington et al. |
| 5,371,659 A | 12/1994 | Pastrick et al. |
| 5,383,057 A | 1/1995 | Kimura et al. |
| 5,467,230 A | 11/1995 | Boddy et al. |
| 5,477,390 A | 12/1995 | Boddy et al. |
| 5,483,385 A | 1/1996 | Boddy |

(Continued)

*Primary Examiner* — Tuyen Tra
*Assistant Examiner* — Rahman Abdur
(74) *Attorney, Agent, or Firm* — HONIGMAN LLP (57) ABSTRACT

A vehicular exterior rearview mirror assembly includes a mirror head movably mounted at a mounting arm via a pivot link. A locking mechanism includes a driving link, a receiver attached to the driving link, and a locking arm. The receiver receives a portion of the pivot link therein and includes a biasing element disposed at each end of the receiver and engaging respective sides of the portion of the pivot link. When the mirror head is moved relative to the mounting arm, the receiver moves to pivot the pivot link and swing the mirror head between retracted and extended positions. When the mirror head is moved to either position, the driving link is pivoted and causes a portion of the locking mechanism to engage the locking arm to move the locking arm into engagement with the mirror head to retain the mirror head in the respective position.

25 Claims, 9 Drawing Sheets

(56) References Cited

U.S. PATENT DOCUMENTS

| | | |
|---|---|---|
| 5,489,080 A | 2/1996 | Allen |
| 5,497,306 A | 3/1996 | Pastrick |
| 5,546,239 A | 8/1996 | Lewis |
| 5,552,094 A | 9/1996 | Kubota |
| 5,555,136 A | 9/1996 | Waldmann et al. |
| 5,572,376 A | 11/1996 | Pace |
| 5,582,383 A | 12/1996 | Mertens et al. |
| 5,600,497 A | 2/1997 | Leonberger |
| 5,669,699 A | 9/1997 | Pastrick et al. |
| 5,680,263 A | 10/1997 | Zimmermann et al. |
| 5,684,646 A | 11/1997 | Boddy |
| 5,701,211 A | 12/1997 | Perry et al. |
| 5,703,731 A | 12/1997 | Boddy et al. |
| 5,790,298 A | 8/1998 | Tonar |
| 5,793,543 A | 8/1998 | Kimura et al. |
| 5,823,654 A | 10/1998 | Pastrick et al. |
| 5,949,591 A | 9/1999 | Whitehead |
| 5,980,047 A | 11/1999 | Kogita et al. |
| 5,984,482 A | 11/1999 | Rumsey et al. |
| 6,106,122 A | 8/2000 | Gilbert et al. |
| 6,116,743 A | 9/2000 | Hoek |
| 6,170,956 B1 | 1/2001 | Rumsey et al. |
| 6,176,602 B1 | 1/2001 | Pastrick et al. |
| 6,178,034 B1 | 1/2001 | Allemand et al. |
| 6,213,609 B1 | 4/2001 | Foote et al. |
| 6,213,612 B1 | 4/2001 | Schnell et al. |
| 6,227,675 B1 | 5/2001 | Mertens et al. |
| 6,229,319 B1 | 5/2001 | Johnson |
| 6,239,899 B1 | 5/2001 | DeVries et al. |
| 6,239,928 B1 | 5/2001 | Whitehead et al. |
| 6,243,218 B1 | 6/2001 | Whitehead |
| 6,249,369 B1 | 6/2001 | Theiste et al. |
| 6,276,808 B1 | 8/2001 | Foote et al. |
| 6,276,821 B1 | 8/2001 | Pastrick et al. |
| 6,312,135 B1 | 11/2001 | Polzer |
| 6,315,419 B1 | 11/2001 | Platzer, Jr. |
| 6,315,421 B1 | 11/2001 | Apfelbeck et al. |
| 6,318,870 B1 | 11/2001 | Spooner et al. |
| 6,325,518 B1 | 12/2001 | Whitehead et al. |
| 6,394,616 B1 | 5/2002 | Foote et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,467,920 B2 | 10/2002 | Schnell et al. |
| 6,497,491 B2 | 12/2002 | Boddy et al. |
| 6,499,850 B2 | 12/2002 | Waldmann |
| 6,502,970 B1 | 1/2003 | Anderson et al. |
| 6,522,451 B1 | 2/2003 | Lynam |
| 6,535,126 B2 | 3/2003 | Lin et al. |
| 6,565,221 B2 | 5/2003 | Guttenberger et al. |
| 6,582,109 B2 | 6/2003 | Miller |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,690,268 B2 | 2/2004 | Schofield et al. |
| 6,698,905 B1 | 3/2004 | Whitehead |
| 6,717,712 B2 | 4/2004 | Lynam et al. |
| 6,916,100 B2 | 7/2005 | Pavao |
| 6,954,152 B1 | 10/2005 | Matthews |
| 6,981,774 B2 | 1/2006 | Dumont et al. |
| 7,012,729 B2 | 3/2006 | Tonazzi et al. |
| 7,070,287 B2 | 7/2006 | Foote et al. |
| 7,080,914 B1 | 7/2006 | Boddy |
| 7,093,946 B2 | 8/2006 | Barve et al. |
| 7,093,965 B2 | 8/2006 | Veldman |
| 7,097,312 B2 | 8/2006 | Platzer, Jr. |
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,195,381 B2 | 3/2007 | Lynam et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,267,449 B1 | 9/2007 | Boddy et al. |
| 7,274,501 B2 | 9/2007 | McCabe et al. |
| 7,289,037 B2 | 10/2007 | Uken et al. |
| 7,314,285 B2 | 1/2008 | Ruse et al. |
| 7,338,177 B2 | 3/2008 | Lynam |
| 7,354,165 B1 | 4/2008 | Ruse et al. |
| 7,370,983 B2 | 5/2008 | DeWind et al. |
| 7,420,756 B2 | 9/2008 | Lynam |
| 7,455,414 B2 | 11/2008 | Duroux et al. |
| 7,510,311 B2 | 3/2009 | Romas et al. |
| 7,532,149 B2 | 5/2009 | Banko et al. |
| 7,626,749 B2 | 12/2009 | Baur et al. |
| 7,690,800 B2 | 4/2010 | Fukai et al. |
| 7,722,199 B2 | 5/2010 | DeWard et al. |
| 7,748,856 B2 | 7/2010 | Zhao |
| 7,817,020 B2 | 10/2010 | Turnbull et al. |
| 7,824,045 B2 | 11/2010 | Zhao |
| 7,883,224 B2 | 2/2011 | Onuki |
| 7,887,204 B2 | 2/2011 | Zhao |
| 7,926,960 B2 | 4/2011 | Skiver et al. |
| 7,934,844 B1 | 5/2011 | Zhao |
| 7,944,371 B2 | 5/2011 | Foote et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| 8,021,005 B2 | 9/2011 | Zhao |
| 8,048,085 B2 | 11/2011 | Peterson et al. |
| 8,049,640 B2 | 11/2011 | Uken et al. |
| 8,154,418 B2 | 4/2012 | Peterson et al. |
| 8,169,684 B2 | 5/2012 | Bugno et al. |
| 8,179,586 B2 | 5/2012 | Schofield et al. |
| 8,194,133 B2 | 6/2012 | DeWind et al. |
| 8,237,909 B2 | 8/2012 | Ostreko et al. |
| 8,339,526 B2 | 12/2012 | Minikey, Jr. et al. |
| 8,366,285 B2 | 2/2013 | Reedman et al. |
| 8,465,161 B2 | 6/2013 | DeWind et al. |
| 8,508,831 B2 | 8/2013 | De Wind et al. |
| 8,602,575 B2 | 12/2013 | Negel |
| 8,730,553 B2 | 5/2014 | De Wind et al. |
| 8,736,940 B2 | 5/2014 | Rawlings |
| 8,786,704 B2 | 7/2014 | Foote et al. |
| 8,915,601 B2 | 12/2014 | Foote et al. |
| 8,917,437 B2 | 12/2014 | Baur et al. |
| 9,067,541 B2 | 6/2015 | Sobecki et al. |
| 9,796,334 B2 | 10/2017 | Peterson et al. |
| 10,220,787 B2 | 3/2019 | Peterson et al. |
| 10,875,454 B2 | 12/2020 | Peterson et al. |
| 11,718,232 B2 | 8/2023 | Peterson et al. |
| 2006/0050018 A1 | 3/2006 | Hutzel et al. |
| 2006/0061008 A1 | 3/2006 | Karner et al. |
| 2006/0273232 A1 | 12/2006 | Lang et al. |
| 2007/0002477 A1 | 1/2007 | Whitehead |
| 2007/0139751 A1 | 6/2007 | Kuiper et al. |
| 2007/0285812 A1 | 12/2007 | Foote et al. |
| 2009/0040306 A1 | 2/2009 | Foote et al. |
| 2009/0243824 A1 | 10/2009 | Peterson et al. |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2012/0038964 A1 | 2/2012 | De Wind et al. |
| 2012/0236388 A1 | 9/2012 | De Wind et al. |
| 2013/0107386 A1 | 5/2013 | Sobecki et al. |
| 2014/0005907 A1 | 1/2014 | Bajpai |
| 2014/0133044 A1 | 5/2014 | Mambourg |
| 2014/0285666 A1 | 9/2014 | O'Connell et al. |
| 2014/0376119 A1 | 12/2014 | Sobecki et al. |
| 2015/0097955 A1 | 4/2015 | De Wind et al. |
| 2015/0224930 A1 | 8/2015 | Foote et al. |
| 2015/0353018 A1 | 12/2015 | Sobecki et al. |
| 2023/0373392 A1 | 11/2023 | Peterson et al. |

Spring to allow overtravel

VEHICULAR EXTERIOR REARVIEW MIRROR ASSEMBLY WITH LOCKING FEATURE

CROSS REFERENCE TO RELATED APPLICATION

The present application claims the filing benefits of U.S. provisional application Ser. No. 63/199,698, filed Jan. 19, 2021, which is hereby incorporated herein by reference in its entirety.

FIELD OF THE INVENTION

The present invention relates generally to the field of exterior rearview mirror assemblies for vehicles and, more particularly, to extendable and retractable exterior rearview mirror assemblies for vehicles.

BACKGROUND OF THE INVENTION

It is known to provide an automotive exterior rearview mirror assembly that may be extended and retracted, such as for trailer towing applications, where the mirror assembly may be extended to provide enhanced rearward viewing to the driver of the trailer pulling vehicle. Examples of extendable and retractable mirror assemblies are described in U.S. Pat. Nos. 5,483,385; 6,116,743; 6,213,609; 6,239,928; 6,276,808; 6,325,518; 6,394,616 and/or 6,497,491, which are hereby incorporated herein by reference in their entireties.

SUMMARY OF THE INVENTION

An exterior rearview mirror assembly (configured for mounting at a side of an equipped vehicle) includes an extending/retracting mechanism and actuator that is operable to move the mirror head between a retracted position and an extended position. The actuator may comprise a motor that is disposed at a mounting structure for mounting the mirror head at the side of the vehicle. The motor, when actuated, pivots a link that is connected between a portion of the mirror head and the actuator, whereby pivotal movement of the link moves the portion of the mirror head, which, in turn, causes pivotal movement of another link, which is connected between another portion of the mirror head and the mounting structure. The pivoting of the one or more links swings the mirror head relative to the mounting structure while also optionally pivoting or angling or canting the mirror head relative to the mounting structure and the side of the vehicle. For example, when the actuator moves the mirror head from its retracted state to its extended state, the mirror head may move outboard and may angle rearward and towards the side of the vehicle so that the reflective element is angled or canted towards the vehicle to provide enhanced viewing by the driver of the vehicle when in its extended state. The mirror assembly includes a mechanical locking mechanism to retain the mirror head in the extended position and in the retracted position.

For example, the mirror assembly includes an adjustment mechanism operable to adjust the mirror head relative to the mounting arm between the retracted position and the extended position. The adjustment mechanism includes a lock driving link that has a link-engaging portion that engages a portion of the link. The link-engaging portion includes a receiver that receives the portion of the link therein and that has a biasing element at each end of the receiver and at opposite sides of and engaging the received portion of the link. When the lock driving link is pivoted, the receiver moves to move the portion of the link and to pivot the link and swing the mirror head along an arcuate path between the retracted position and the extended position. When the mirror head is pivoted to the retracted position or the extended position and is at the retracted position or the extended position, further pivoting of the lock driving link moves the receiver and does not move the portion of the link. The further pivoting of the lock driving link causes the lock driving link to engage a locking arm at the mounting arm to move the locking arm into engagement with a locking tab at the mirror head to secure the mirror head in the retracted position or the extended position.

These and other objects, advantages, purposes and features of the present invention will become apparent upon review of the following specification in conjunction with the drawings.

DESCRIPTION OF THE PREFERRED EMBODIMENTS

Figure 1:
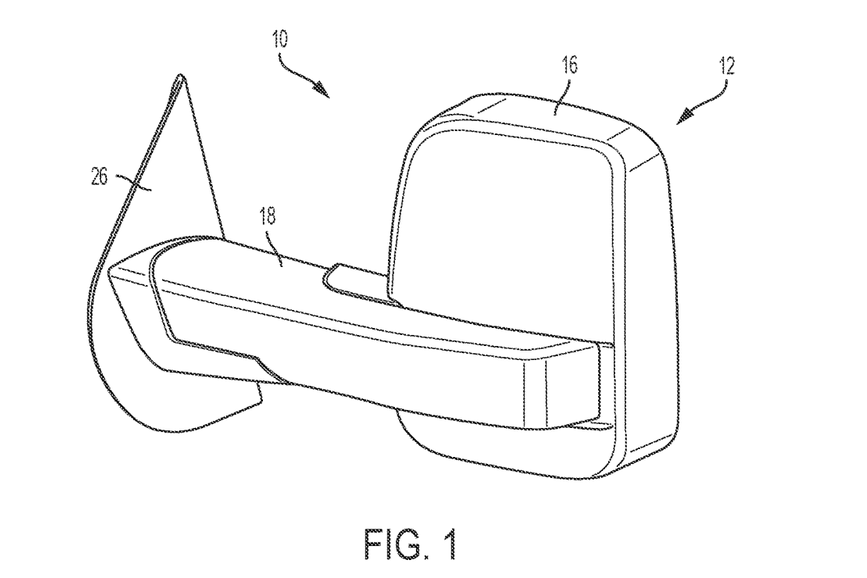
FIG. 1 is a perspective view of an exterior rearview mirror assembly, shown in its retracted state.
Figure 2:
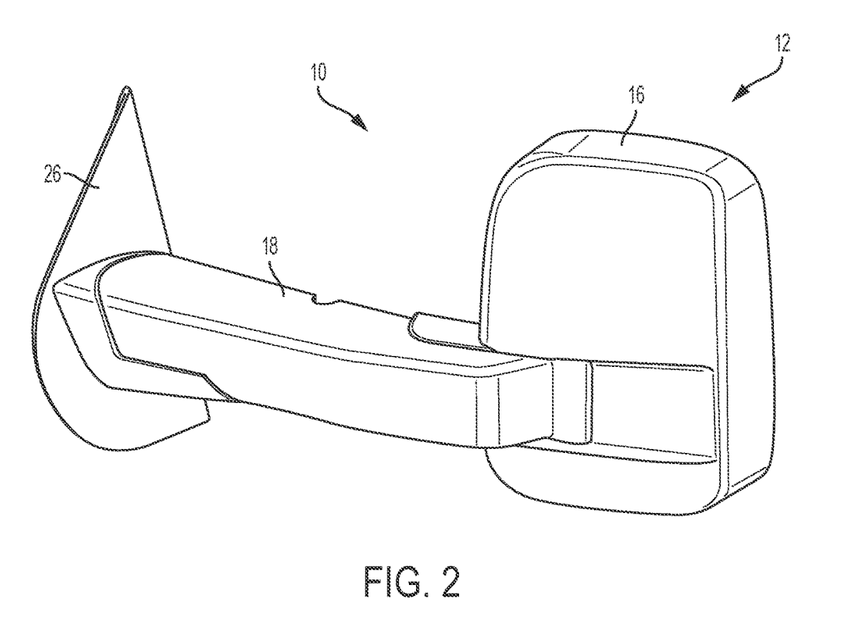
FIG. 2 is another perspective view of the exterior rearview mirror assembly of FIG. 1, shown in its extended state.
Figure 3:
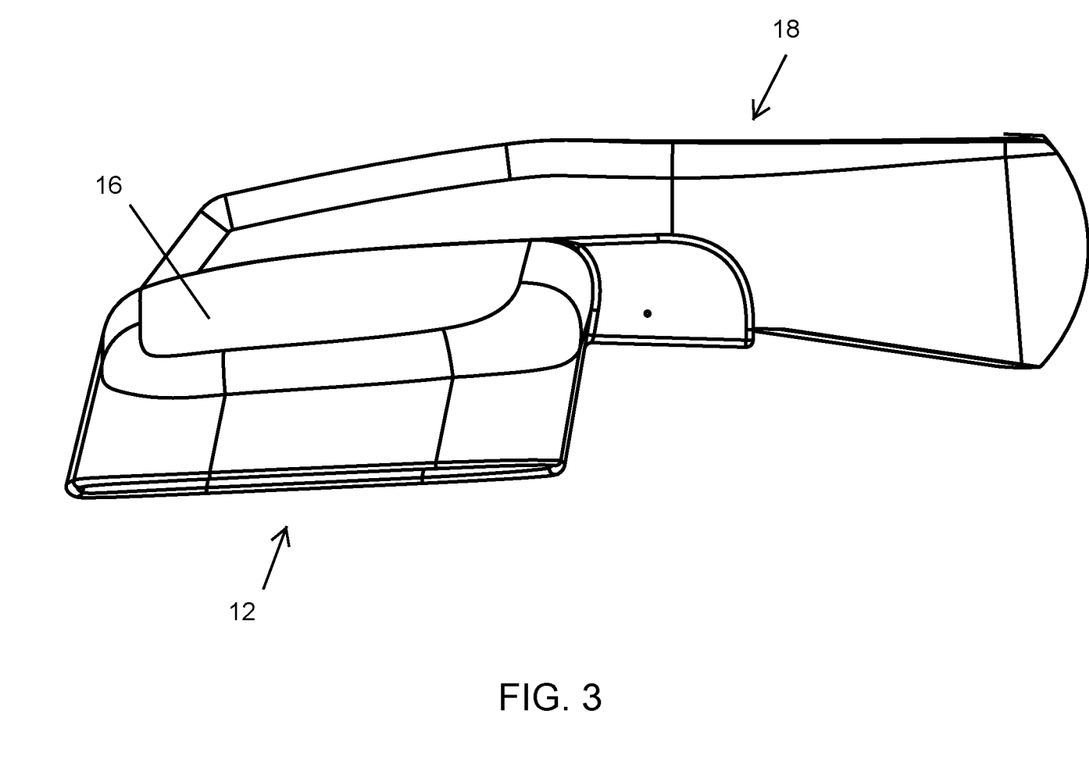
FIG. 3 is a top plan view of the exterior rearview mirror assembly of FIG. 1.
Figure 4:
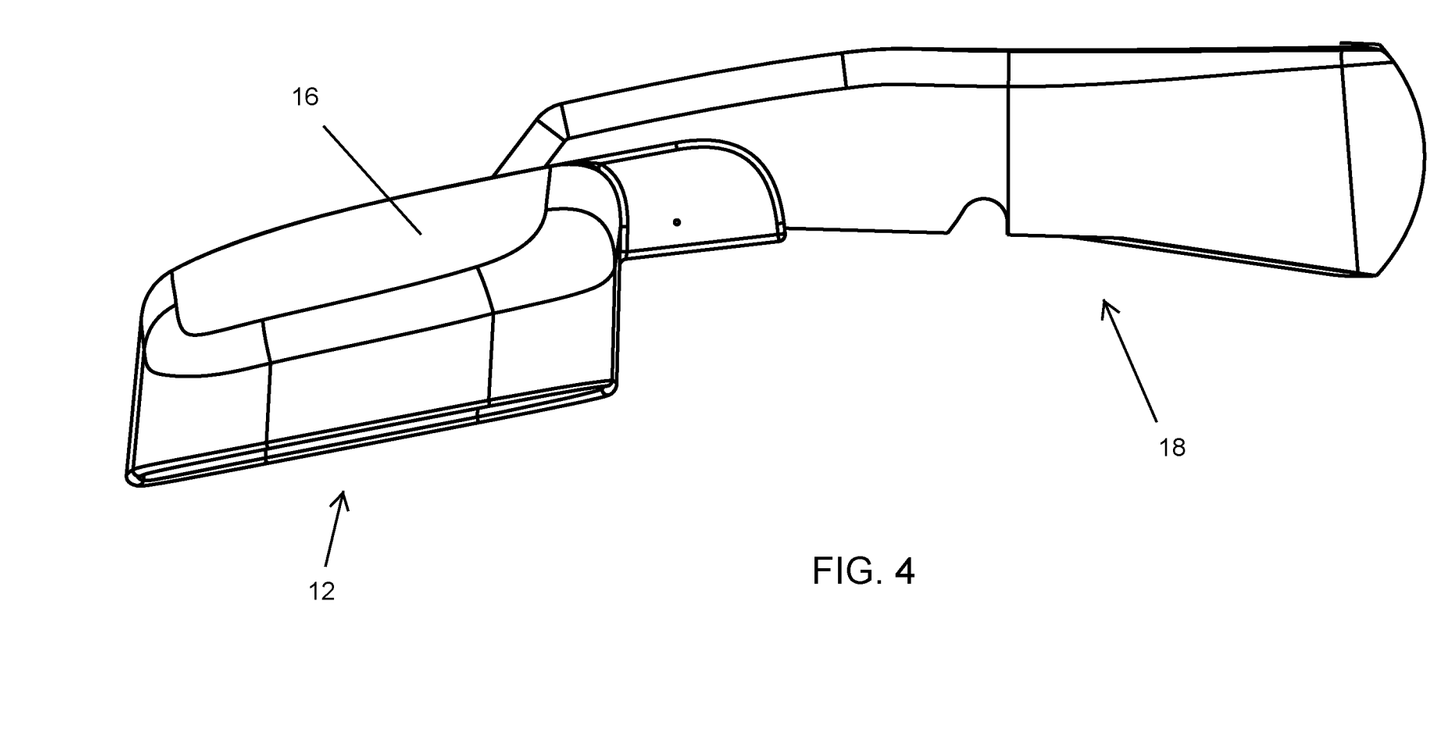
FIG. 4 is a top plan view of the exterior rearview mirror assembly of FIG. 2.

Referring now to the drawings and the illustrative embodiments depicted therein, an exterior rearview mirror assembly 10 for a vehicle includes a mirror head 12 having a mirror reflective element and a mirror shell or casing 16, with the mirror head 12 being adjustably mounted at a mounting structure or arm 18 and adjustable via an adjustment mechanism or device 20 that adjusts the mirror head 12 between a retracted state (FIG. 1) and an extended state (FIG. 2). The adjustment mechanism 20 includes a rotary actuator that is operable to pivot an inner or inboard or pivot link 22 that is connected between an inboard portion or inboard mounting post or stanchion or pin of the mirror head 12 and the actuator, which swings the inboard portion of the mirror head 12, which causes an outer or outboard or second pivot link 24 (pivotally connected at one end to the adjustment mechanism 20 or mounting arm 18 and at the other end to an outboard mounting post or stanchion or pin of the mirror head 12) to swing or pivot an outboard portion (outboard of the inboard portion) of the mirror head 12, whereby the mirror head 12 is swung or swept or arcuately moved between the extended and retracted states, as discussed below. The lengths and mounting locations of the links 22, 24 may be selected such that, as the mirror head 12 is swung outwards to its extended position, the mirror head 12 (and reflective element) pivot so as to be pivoted or canted rearward and inward so that the mirror reflective element is angled or canted towards the driver to provide an enhanced viewing angle to the driver, as also discussed below. The mirror assembly 10 may utilize aspects of the mirror assemblies described in U.S. Pat. No. 9,796,334, which is hereby incorporated herein by reference in its entirety.

In the illustrated embodiment, the mounting structure 18 comprises an elongated arm that is pivotally mounted at a base portion 26, which is configured to attach at a side of a vehicle. The base portion 26 of the mirror assembly 10 is mounted at the side of a host or subject vehicle, with the reflective element providing a rearward field of view along the respective side of the vehicle to the driver of the vehicle.

The mirror assembly 10 may comprise a powerfold mirror assembly that includes an actuator that is operable to pivot the mounting structure or arm 18 and the mirror head 12 relative to the base portion 26. The actuator may operate in response to a user input to pivot the mounting arm 18 and mirror head 12 between a use position (as shown), where the mirror head 12 and mounting arm 18 are extended from the side of the vehicle so as to provide the field of view rearward and sideward of the vehicle to the driver, and a folded position, where the arm 18 and mirror head 12 may be pivoted inward so as to be disposed generally along the side of the vehicle. Although shown as pivotally mounting at the base portion 26, such as for a powerfold mirror application (where the mounting structure or arm 18 and the mirror head 12 may be pivoted relative to the base portion 26 via an actuator assembly or adjustment device) or breakaway mirror application, the mounting arm or structure may be fixedly mounted at a base portion or at the side of the vehicle.

The mounting arm or structure 18 supports or houses the adjustment mechanism 20, and is formed so that the mirror casing 16 of the mirror head 12 engages or nests at the outer portion of the mounting structure 18 when in its retracted position, and extends from the outer portion of the mounting structure 18 when in its extended position, such as can be seen with reference to FIGS. 1-4. The rear of the mirror casing 16 may include a channel or contour that at least partially receives a portion of the mounting arm 18.

The four-link extendable trailer tow mirror mechanism relies on the cinching action of the detent system on the pivot link to retain the mirror head at the selected position (extended or retracted). Vibration input and wind load can force the mirror head off of the contact pads between the head bracket and the arm, reducing glass stability. The cinching force is limited by the detent force allowed by the manual extend/retract effort (so that a user can manually adjust mirror without too much effort). The cinching force is further limited by the friction in the bushings of the four-link mechanism. In other words, when the mirror head 12 is moved between the extended and retracted positions via the adjustment mechanism 20, the mirror head may be maintained in the extended and retracted positions via the cinching action of the detent system of the actuator and the force provided by the cinching action is limited, for example, so that the cinching force may be overcome to manually move the mirror head 12 between the extended and retracted positions.

Figure 5:
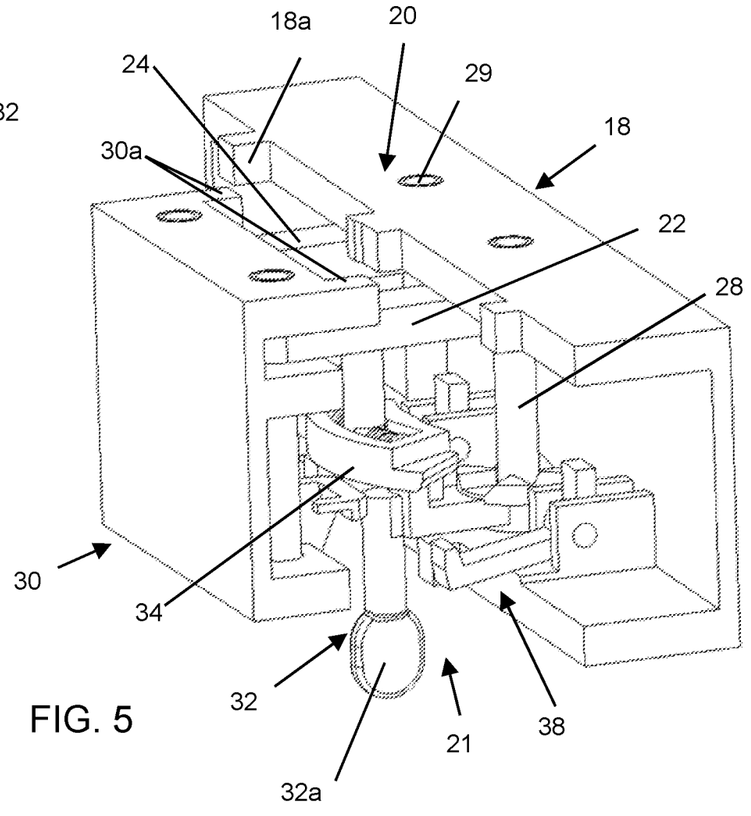
FIG. 5 is a perspective view of an adjustment mechanism that moves and locks the mirror head relative to the mounting arm.

As shown in FIG. 5, the adjustment mechanism 20 is received in the mounting arm 18 and attached thereto, such as via a mounting bracket or brace that may be attached to the mounting arm 18 via one or more fasteners to retain the adjustment mechanism 20 and its actuator at the mounting arm or structure 18. The inboard link or pivot or driving link 22 is pivotally mounted at one end to a pivot shaft 28 of the base or arm 18 and at the other end to a bracket 30 of the mirror head 12, while the outboard link or follower link 24 is pivotally mounted at one end to a pivot shaft 29 of the base or arm 18 and at the other end to the bracket 30 of the mirror head 12. The pivot link 22 may be driven by an electrically-powered actuator in a power extend application, and may be held in position by a spring loaded detent feature in a manual extend application.

The adjustment mechanism 20 includes a locking mechanism 21 between the mounting arm 18 and the mirror head bracket 30 to prevent the head bracket 30 from coming off the contact pads on the arm 18 under wind load or vibration input. The locking mechanism 21 may include a locking arm, lever, cam or hook that may be activated after the mirror head bracket 30 makes contact with the arm 18, and locking may require a separate action that is additional to or separate from the movement of the head bracket 30 relative to the mounting arm 18 when moving the mirror head 12 between the retracted and extended positions, as discussed below. The pivot linkage 22 (previously driven directly by an actuator or held in place by a spring loaded detent feature) is driven by a lock driving link 32, which is driven directly by an actuator or held in place by a spring loaded detent feature.

Figure 6:
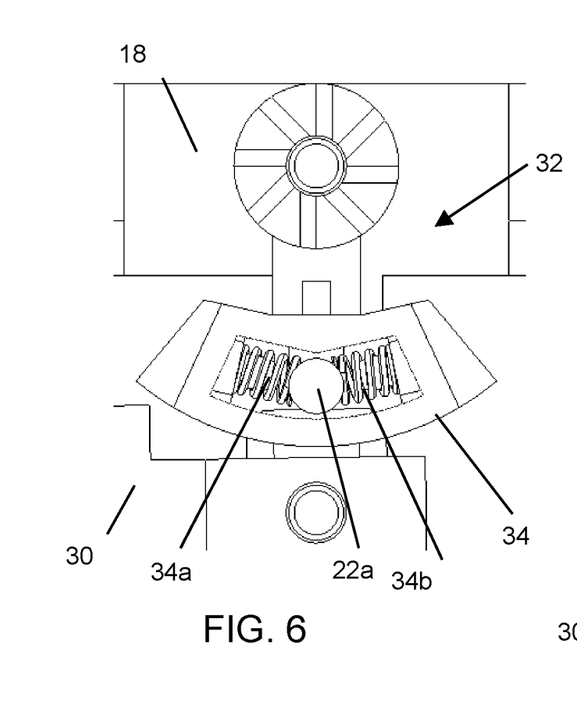
FIGS. 6 and 7 are plan views of a lock driving link that pivots to impart pivoting of one of the linkages that mounts the mirror head at the mounting arm.
Figure 7:
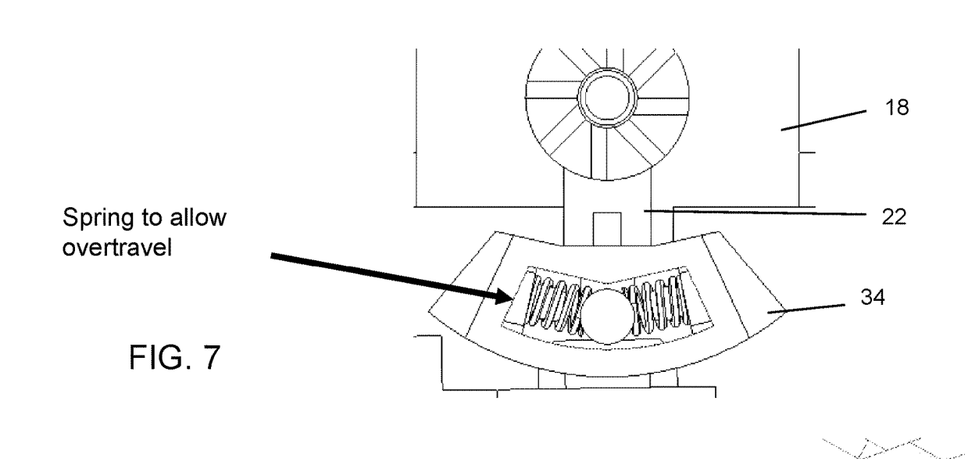
Figure 8:
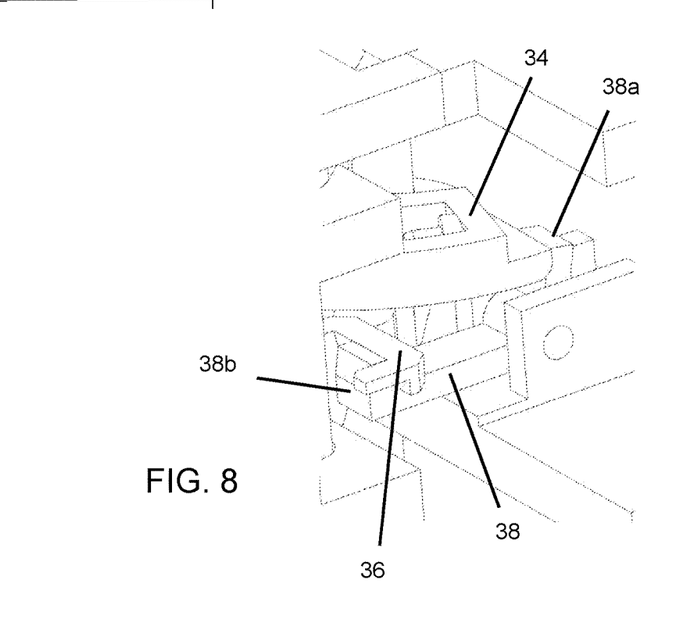
FIG. 8 is an enlarged view of a locking arm that functions to lock the mirror head at the extended position or the retracted position.

In the illustrated embodiment, the link 22 is pivoted relative to the shaft 28 via pivotal movement of the lock driving link 32, which may be rotatably driven via an actuator shaft or which may be rotated via movement of a tab 32a of the lock driving link 32. The tab 32a may extend downward and may be accessible at a lower region of the mirror head 12 and/or mounting arm 18 and may move along an arcuate slot at the lower region (such as at the lower region of the mirror casing 16 of the mirror head 12), whereby movement of the tab 32a along the arcuate slot results in pivotal movement of the lock driving link 32. The lock driving link 32 includes a receiving portion or receiver or an arcuate link-engaging portion 34, which has an arcuate slot that receives a pin or portion 22a of the link 22. The link-engaging portion 34 includes a pair of biasing elements 34a, 34b (e.g., coil springs or other suitable compressible and extendable biasing elements) that engage a respective end portion of the link-engaging portion 34 and that engage a respective side of the pin or portion 22a of the link 22. For example, and as shown in FIG. 6, the pin 22a of the link 22 is received within the arcuate slot of the link-engaging portion 34. A first biasing element 34a engages a first side or portion of the pin 22a at a first side and engages a first edge or side or portion of the slot at a second side. A second biasing element 34b engages a second side of the pin 22a opposite the first side of the pin and engages a second edge of the slot. Thus, the pin 22a is sandwiched between the biasing elements 34a, 34b within the arcuate slot of the link-engaging portion 34. The pin 22a may have respective engaging portions or flattened surfaces on opposite sides of the pin 22a for engaging the biasing elements 34a, 34b, and the respective engaging portions may comprise, for example, substantially flat portions or any suitable engaging feature for receiving the biasing elements 34a, 34b. Thus, when the lock driving link 32 is pivoted, one of the biasing elements 34a, 34b is urged against the pin 22a to impart pivotal movement of the link 22 to swing the mirror head 12 relative to the mounting arm 18.

When the mirror head 12 is pivoted or swung toward the extended or retracted position, the mirror head bracket 30 engages the mounting arm 18 to limit movement of the mirror head 12 relative to the mounting arm 18 at the extended position or the retracted position. In the illustrated embodiment, the mirror head bracket 30 includes a plurality of tabs or protrusions or pads 30a that engage corresponding tabs or protrusions or pads 18a of the mounting arm.

The mirror head bracket 30 also includes a locking tab 36 that is engaged by a respective locking arm or hook 38, 40 pivotally mounted at the base 18 to maintain the mirror head 12 in the extended or retracted position. The respective locking arms or hooks may correspond to a first arm or hook 38 and a second arm or hook 40 spaced from the first arm 38 so as to engage the locking tab 36 and maintain the mirror head in different positions relative to the mounting arm 18. For example, engagement of the locking tab 36 and the first arm or hook 38 may maintain the mirror head 12 in the retracted position and engagement of the locking tab 36 and the second arm or hook 40 may maintain the mirror head 12 in the extended position. The locking arm 38, 40 is pivoted into engagement with the locking tab 36 when the mirror head 12 is at the extended position or retracted position, and when the lock driving link 32 is further pivoted so that a portion of the locking mechanism engages a tab 38a, 40a of the respective locking arm 38, 40. When the lock driving link 32 engages the tab 38a, 40a, the locking arm 38, 40 pivots to move a locking end 38b, 40b of the locking arm 38, 40 into engagement with the locking tab 36 of the mirror head bracket 30 so as to retain the mirror head bracket and the mirror head at the extended position or retracted position. For example, the link-engaging portion 34 of the lock driving link 32 may include respective tabs or protrusions or portions on opposing ends of the link-engaging portion 34 for engaging the respective tabs 38a, 40a when the lock driving link 32 is further pivoted to lock or secure the mirror head 12 in the extended or retracted position.

During operation, the lock driving link 32 (which may be rotated via an electrically operated actuator) pushes the driving linkage 22 into position via one of the springs 34a, 34b and the respective end of the arcuate link-engaging portion 34. The spring is disposed between the lock driving link 32 and the portion 22a of the driving linkage 22, and may be positioned on a protrusion at the respective end of the arcuate link-engaging portion 34. When the head bracket 30 makes contact with the arm 18, the lock driving link 32 must travel further to engage the locking hook 38, and can do so via compression of one of the springs 34a, 34b as the lock driving link 32 is further pivoted after the mirror head bracket 30 engages the arm 18 (with such further pivoting moving the link-engaging portion 34 and not moving the portion 22a of the linkage 22). The set of locking hooks 38 are attached to the arm 18 and pivot upwards to engage the locking tab 36 or feature on the head bracket 30 when they are activated by the lock driving link 32.

Figures 9, 10, 11:
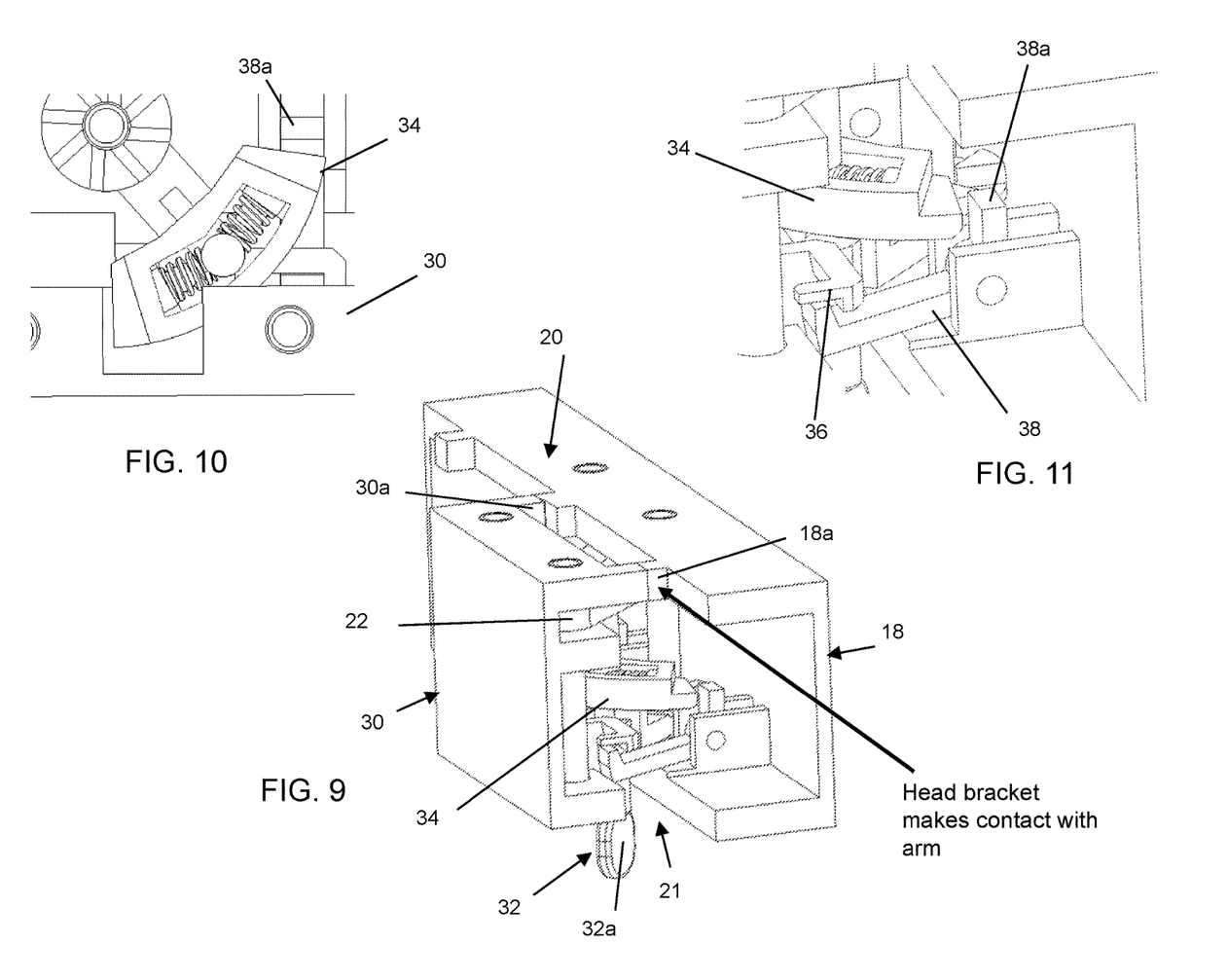
FIGS. 9-11 are views similar to the views of FIGS. 5, 6 and 8, respectively, showing the mirror head pivoted to the retracted position.

Thus, and such as can be seen with reference to FIGS. 9-14, when the mirror head 12 is moved toward the retracted position by pivoting or rotating the lock driving link 32 to move the pin 22a of the pivot link 22 and thus to pivot the pivot link 22 (and mirror head), the pin 22a is generally centered in the arcuate slot of the link-engaging portion 34 of the lock driving link 32 via the spring forces acting on both sides of the pin 22a. The mirror head 12 is pivoted or moved until the pads 30a of the mirror head bracket 30 engage the pads 18a of the arm 18 (see FIG. 9) to stop further movement of the mirror head 12 relative to the arm 18. As shown in FIG. 11, at this point, the locking arm 38 is not engaged with the tab 36 of the mirror head bracket 30 and the link-engaging portion 34 is spaced from the tab 38a of the locking arm 38.

Figures 12, 13, 14:
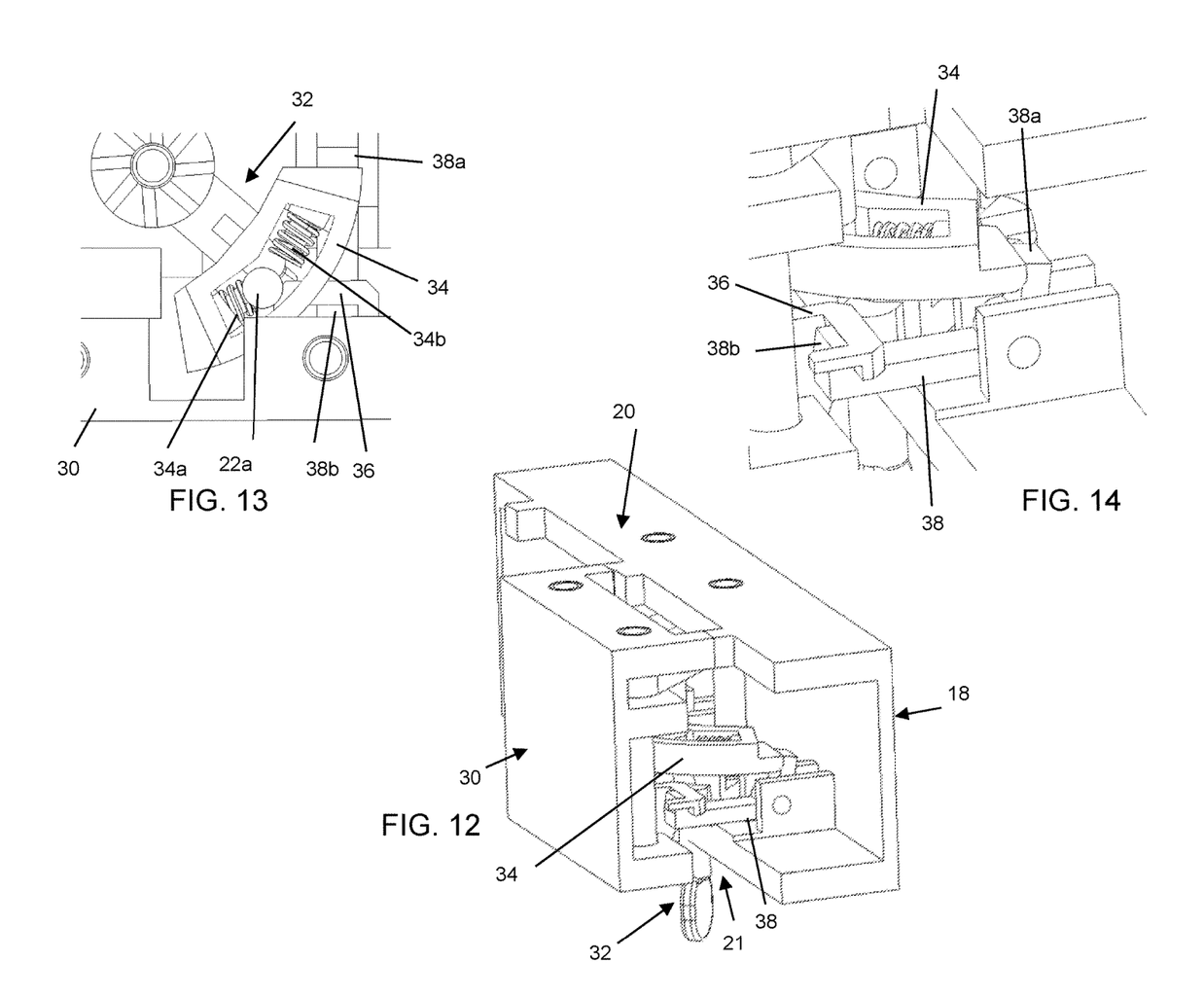
FIGS. 12-14 are views similar to the views of FIGS. 5, 6 and 8, respectively, showing the lock driving link being further pivoted to engage the locking arm to secure or retain the mirror head in the retracted position.

As shown in FIGS. 12-14, after the mirror head bracket 30 engages the arm 18 and does not move further, the lock driving link 32 continues to travel, whereby the biasing element 34a compresses to allow for further movement of the lock driving link 32 while the mirror head bracket 30 and the pivot link 22 and pin 22a remain in position relative to the arm 18. The further movement of the lock driving link 32 causes the end of the link-engaging portion 34 of the lock driving link 32 to engage the tab 38a of the locking arm 38, which causes the locking arm 38 to pivot upward so that the locking end 38b of the locking arm 38 engages the tab 36 of the mirror head bracket 30, thereby retaining the mirror head bracket 30, and the mirror head 12, in the retracted position.

When it is desired to extend the mirror head 12 from the retracted position, the lock driving link 32 is pivoted in the opposite direction, which disengages the end of the link-engaging portion 34 of the lock driving link 32 from the tab 38a of the locking arm 38, thereby allowing the locking arm 38 to pivot downward and to disengage the locking end 38b from the tab 36 of the mirror head bracket 30. The lock driving link 32 may be rotated in the opposite direction via operation of the actuator, or the lock driving link 32 may be rotated in the opposite direction via manual movement of the tab 32a, which may be moved enough to disengage the link-engaging portion 34 from the locking arm 38 to allow the locking arm 38 to pivot downward. Optionally, the locking arm 38 may be biased toward the disengaged or downward position, such as via a biasing element or torsional spring or the like. Biasing the locking arm 38 toward the disengaged position may ensure that the mirror head 12 is not stuck in the locked position when the link-engaging portion 34 disengages the tab 38a of the locking arm 38. After the locking end 38b of the locking arm 38 disengages the tab 36 of the mirror head bracket 30, the mirror head bracket 30 and the mirror head 12 may then be freely swung toward the extended position.

Figures 15, 16, 17:
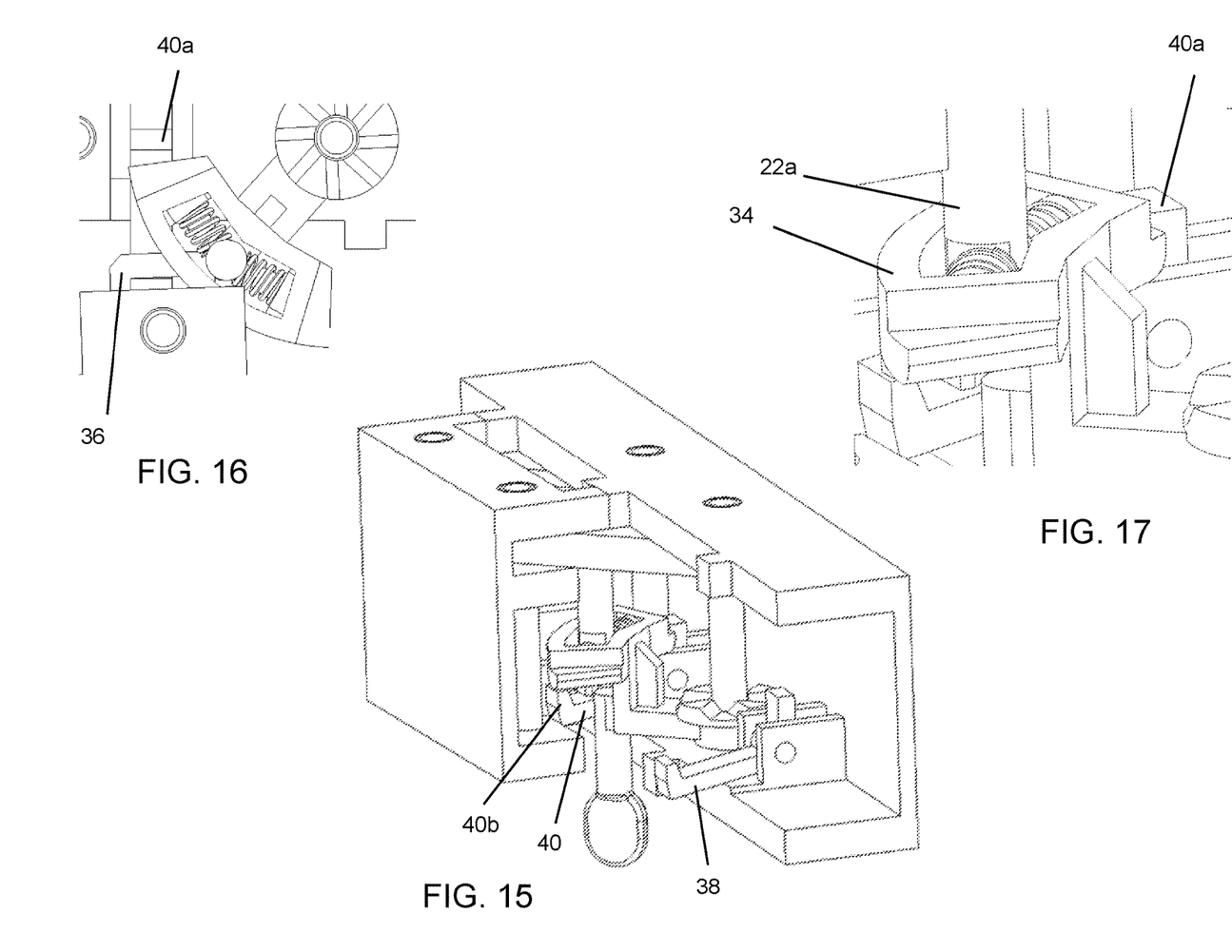
FIGS. 15-17 are views showing pivoting of the mirror head to the extended position.

As the mirror head 12 is extended by pivoting or rotating the lock driving link 32 to move the pin 22a of the pivot link 22 and thus to pivot the pivot link 22 (and mirror head 12), the pin 22a is again generally centered in the arcuate slot of the link-engaging portion 34 of the lock driving link 32 via the spring forces acting on both sides of the pin 22a. The mirror head 12 is pivoted or moved until the pads 30a of the mirror head bracket 30 engage the pads 18a of the arm 18 (see FIG. 15) to stop further movement of the mirror head 12 relative to the arm 18. As shown in FIGS. 15 and 16, at this point, the locking arm 40 is aligned with but not engaged with the tab 36 of the mirror head bracket 30.

Figures 18, 19, 20:
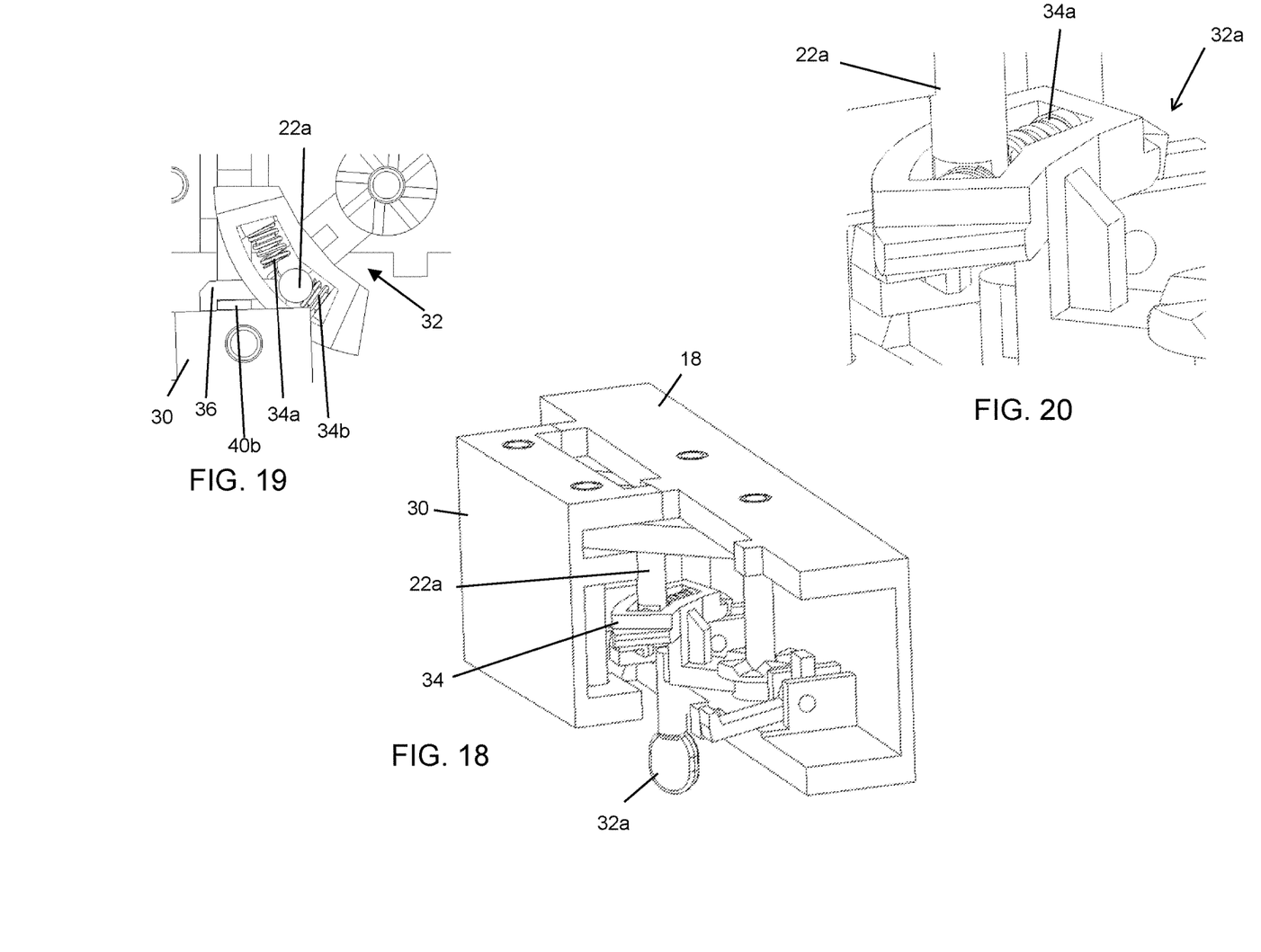
FIGS. 18-20 are views showing the further pivoting of the lock driving link to engage the other locking arm to secure or retain the mirror head in the extended position.

As shown in FIGS. 18-20, after the mirror head bracket 30 engages the arm 18 and does not move further, the lock driving link 32 continues to travel, whereby the biasing element 34b compresses to allow for further movement of the lock driving link 32 while the mirror head bracket 30 and the pivot link 22 and pin 22a remain in position relative to the arm 18. The further movement of the lock driving link 32 causes the end of the link-engaging portion 34 of the lock driving link 32 to engage the tab 40a of the locking arm 40, which causes the locking arm 40 to pivot upward so that the locking end 40b of the locking arm 40 engages the tab 36 of the mirror head bracket 30, thereby retaining the mirror head bracket 30, and the mirror head 12, in the extended position.

Thus, the drive mechanism locks the mirror head bracket relative to the mounting arm to reduce head looseness in the retracted position and in the extended position. The manual extend/retract effort can be significantly reduced, since the locking arms are disengaged when it is desired to change the position of the mirror head. The locking links can be disengaged in order to manually extend/retract the mirror head by actuating or moving the lock driving link in the opposite direction.

Thus, the extension/retraction mechanism or device is operable to extend or retract or move the mirror head between its retracted and extended positions or states, and the locking mechanism provides mechanical securement and retention of the mirror head in each position. Optionally, the mechanism may allow bypassing the locking link by lifting the head bracket up out of locking position (spring loaded down by default) so that manually activating the lock driving link by hand would not be necessary for the manual extend/retract function.

The "4-link" lock mechanism provides improved vibration performance of the 4-link power extend trailer tow mirror. The mechanism achieves this by locking the mirror head to the arm bracket once the mirror head is cinched to the arm bracket by the power extend actuator or manual detent system. The mechanism locks the mirror head to the arm bracket with a set of pivoting hooks, which are activated by a linkage that is driven by the power extend actuator (or is driven manually in the case of a manual extending mirror). The linkage that activates the hooks can be combined with the linkage that extends and retracts the mirror head. To activate the hooks, the linkage (if combined) must travel past the position where the mirror head is cinched to the arm bracket. This can be accomplished by adding a set of springs to the linkage, which allows the linkage to travel to the point at which it can cinch the mirror head to the arm, then continue to travel to the point at which it activates the locking hooks.

The mirror assembly may comprise any suitable mirror assembly or structure or housing. Optionally, the mirror assembly may utilize aspects of the mirror assemblies described in U.S. Publication No. US-2015-0224930, which is hereby incorporated herein by reference in its entirety. Optionally, the exterior rearview mirror assembly may include a spotter mirror element to provide a wide angle rearward field of view to the driver of the vehicle equipped with the mirror assembly. The spotter mirror element may utilize aspects of the mirrors described in U.S. Pat. Nos. 8,917,437; 7,255,451; 7,195,381; 6,717,712; 7,126,456; 6,315,419; 7,097,312; 6,522,451; 6,315,419; 5,080,492; 5,050,977; 5,033,835; 8,736,940; 8,021,005; 7,934,844; 7,887,204; 7,824,045 and/or 7,748,856, which are hereby incorporated herein by reference in their entireties.

Optionally, the exterior rearview mirror assembly may include a turn signal indicator or the like for indicating to drivers of other vehicles that the driver of the equipped vehicle has actuated a turn signal of the vehicle. The turn signal indicator of the exterior rearview mirror assembly may utilize aspects of the mirror systems described in U.S. Pat. Nos. 6,198,409; 5,929,786 and/or 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 8,764,256; 7,581,859; 6,227,689; 6,582,109; 5,371,659; 5,497,306; 5,669,699; 5,823,654; 6,176,602 and/or 6,276,821, and/or U.S. Publication Nos. US-2013-0242586 and/or US-2015-0224919, and/or International Publication Nos. WO 2006/124682 and/or WO 2015/148611, which are all hereby incorporated herein by reference in their entireties.

Such an indicator or indicators may function as a lane change assist (LCA) indicator or indicators and/or a blind spot indicator or indicators. Such blind spot indicators are typically activated when an object is detected (via an object detection or side object or blind spot detection system or the like such as described in U.S. Pat. Nos. 5,550,677; 5,760,962; 6,097,023; 5,796,094; 5,715,093; 7,526,103; 6,250,148; 6,341,523; 6,353,392; 6,313,454; 5,670,935; 6,201,642; 6,396,397; 6,498,620; 6,717,610; 6,757,109; 7,005,974; 7,038,577; 6,882,287; 6,198,409; 5,929,786; 5,786,772; 7,038,577; 6,882,287; 6,198,409; 5,929,786; 5,786,772; 7,881,496 and/or 7,720,580, and/or International Publication Nos. WO 2007/005942 and/or WO 2004/047421, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane.

Optionally, the exterior mirror element of the mirror assembly may include heater pad or film or element at a rear surface of the mirror reflective element. The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. Pat. Publication Nos. US-2008-0011733 and/or US-2011-0286096, which are hereby incorporated herein by reference in their entireties.

The reflective elements of the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in U.S. Pat. Nos. 8,503,061; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, it is envisioned that aspects of the mirror assemblies may be suitable for a rearview mirror assembly that comprises a non-electro-optic mirror assembly (such as a generally planar or optionally slightly curved mirror substrate) or an electro-optic or electrochromic mirror assembly. Optionally, the rearview mirror assembly may comprise a mirror assembly of the types described in U.S. Pat. Nos. 7,420,756; 7,289,037; 7,274,501; 7,338,177; 7,255,451; 7,249,860; 6,318,870; 6,598,980; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), and can benefit from aspects of the mirror assemblies described herein.

Optionally, the reflective element of the mirror assembly may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/or 8,730,553, and/or U.S. Pat. Pub. No. US-2006-0061008, which are all hereby incorporated herein by reference in their entireties.

Optionally, the exterior rearview mirror assembly may include an imaging sensor (such as a sideward and/or rearward facing imaging sensor or camera that has a sideward/rearward field of view at the side of the vehicle at which the exterior mirror assembly is mounted) that may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. U.S. Pat. Nos. 8,786,704; 5,550,677; 5,670,935; 5,760,962; 6,498, 620; 6,396,397; 6,222,447; 6,201,642; 6,097,023; 5,877, 897; 5,796,094; 5,715,093; 6,922,292; 6,757,109; 6,717, 610; 6,590,719; 6,320,176; 6,559,435; 6,831,261; 6,806, 452; 6,822,563; 6,946,978; 7,038,577; 7,004,606 and/or 7,720,580, which are all hereby incorporated herein by reference in their entireties. Optionally, for example, the vehicle vision system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described U.S. Pat. Nos. 10,099,614; 10,071,687; 9,900,522; 9,834,153; 9,762,880; 9,596,387; 9,380,219; 9,376,066; 9,233,641; 9,126,525 and/or 9,041,806, and/or U.S. Publication Nos. US-2015-0022664 and/or US-2014-0092252, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
a mirror head, the mirror head accommodating a mirror reflective element;
a mounting arm configured for attachment at a side of a vehicle;
wherein the mirror head is adjustably mounted at the mounting arm via a pivot link, and wherein the pivot link comprises (i) a first end that pivotally attaches at the mirror head and (ii) a second end that pivotally attaches at the mounting arm;
wherein, with the mounting arm attached at the side of the vehicle, the mirror head is movable relative to the mounting arm between a retracted position and an extended position, and wherein the mirror head is closer to the side of the vehicle at which the mounting arm is attached when in the retracted position as compared to when the mirror head is in the extended position;
a locking mechanism comprising (i) a driving link, (ii) a receiver attached to the driving link and (iii) a locking arm;
wherein the receiver receives a portion of the pivot link, and wherein the receiver includes (i) a first biasing element disposed at a first end of the receiver and engaging a first side of the received portion of the pivot link and (ii) a second biasing element disposed at a second end of the receiver and engaging a second side of the received portion of the pivot link;
wherein the locking arm is disposed at the mounting arm and is configured to engage the mirror head;
wherein, with the mounting arm attached at the side of the vehicle, and when the mirror head is moved relative to the mounting arm, the receiver moves with the pivot link to move the portion of the pivot link and to pivot the pivot link and swing the mirror head along an arcuate path between the retracted position and the extended position;
wherein, with the mounting arm attached at the side of the vehicle, and with the mirror head at the retracted position or at the extended position, the driving link is pivoted in a first direction relative to the pivot link to move the receiver relative to the pivot link; and
wherein pivoting of the driving link in the first direction relative to the pivot link causes a portion of the locking mechanism to engage the locking arm at the mounting arm to move the locking arm into engagement with the mirror head to retain the mirror head in the respective retracted position or extended position.

2. The vehicular exterior rearview mirror assembly of claim 1, wherein the locking mechanism comprises an electrically operated motor that operates to pivot the driving link.

3. The vehicular exterior rearview mirror assembly of claim 2, wherein pivoting of the driving link via operation of the electrically operated motor causes pivoting of the pivot link relative to the mounting arm.

4. The vehicular exterior rearview mirror assembly of claim 1, further comprising a second pivot link, wherein the second pivot link comprises (i) a first end that pivotally attaches at the mirror head and (ii) a second end that pivotally attaches at the mounting arm, and wherein, with the mounting arm attached at the side of the vehicle, the pivot link and the second pivot link cooperate to swing the mirror head through the arcuate path between the retracted position and the extended position.

5. The vehicular exterior rearview mirror assembly of claim 4, wherein operation of an electrically operated motor pivots the pivot link relative to the mounting arm, whereby the mirror head moves via pivotal movement of the pivot link and the second pivot link.

6. The vehicular exterior rearview mirror assembly of claim 1, wherein, with the mounting arm attached at the side of the vehicle, and with the mirror head retained in the retracted position or the extended position via the locking arm being engaged with the mirror head, pivotal movement of the driving link in a second direction that is opposite from the first direction, disengages the portion of the locking mechanism from the locking arm, allowing the locking arm to move out of engagement with the mirror head.

7. The vehicular exterior rearview mirror assembly of claim 6, wherein pivotal movement of the driving link in the second direction is done via manual actuation of the driving link.

8. The vehicular exterior rearview mirror assembly of claim 1, wherein, with the mounting arm attached at the side of the vehicle, and as the mirror head is moved between the retracted position and the extended position, the portion of the pivot link is maintained at a center region of the receiver by the first and second biasing elements.

9. The vehicular exterior rearview mirror assembly of claim 8, wherein the pivoting of the driving link relative to the pivot link moves the receiver relative to the pivot link due to compression of the first biasing element or the second biasing element.

10. The vehicular exterior rearview mirror assembly of claim 1, wherein, with the mounting arm attached at the side of the vehicle, the mirror head is moved relative to the mounting arm in response to a user input disposed in the vehicle, and wherein the user input is actuatable by a driver of the vehicle at which the vehicular exterior rearview mirror assembly is attached.

11. The vehicular exterior rearview mirror assembly of claim 1, wherein the portion of the locking mechanism comprises the receiver.

12. The vehicular exterior rearview mirror assembly of claim 1, wherein the portion of the pivot link comprises a pin extending from the pivot link, the pin received in the receiver.

13. The vehicular exterior rearview mirror assembly of claim 1, wherein the driving link comprises a tab that, with the mounting arm attached at the side of the vehicle, is movable by a user to move the locking arm out of engagement with the mirror head to release the mirror head from the retracted position or the extended position.

14. The vehicular exterior rearview mirror assembly of claim 13, wherein, with the mirror head released from the retracted position or the extended position, the tab is movable by a user to move the mirror head between the retracted position and the extended position.

15. The vehicular exterior rearview mirror assembly of claim 14, wherein the tab is exposed exterior the mirror head and is movably received along an arcuate slot of a mirror casing of the mirror head.

16. A vehicular exterior rearview mirror assembly, the vehicular exterior rearview mirror assembly comprising:

a mirror head, the mirror head accommodating a mirror reflective element;

a mounting arm configured for attachment at a side of a vehicle;

wherein the mirror head is adjustably mounted at the mounting arm via a first pivot link and a second pivot link, and wherein the first pivot link and the second pivot link each comprise (i) a first end that pivotally attaches at the mirror head and (ii) a second end that pivotally attaches at the mounting arm;

wherein, with the mounting arm attached at the side of the vehicle, the mirror head is movable relative to the mounting arm between a retracted position and an extended position, and wherein the mirror head is closer to the side of the vehicle at which the mounting arm is attached when in the retracted position as compared to when the mirror head is in the extended position;

a locking mechanism comprising (i) a driving link, (ii) a receiver attached to the driving link and (iii) a locking arm;

wherein the receiver receives a portion of the first pivot link, and wherein the receiver includes (i) a first biasing element disposed at a first end of the receiver and engaging a first side of the received portion of the first pivot link and (ii) a second biasing element disposed at a second end of the receiver and engaging a second side of the received portion of the first pivot link;

wherein the locking arm is disposed at the mounting arm and is configured to engage the mirror head;

wherein, with the mounting arm attached at the side of the vehicle, and when the mirror head is moved relative to the mounting arm, the receiver moves with the first pivot link to move the portion of the first pivot link and to pivot the first pivot link and swing the mirror head along an arcuate path between the retracted position and the extended position;

an electrically operated motor operable to pivot the first pivot link relative to the mounting arm;

wherein, with the mounting arm attached at the side of the vehicle, and when the electrically operated motor is electrically operated, the first pivot link is pivoted relative to the mounting arm and the first pivot link and the second pivot link cooperate to swing the mirror head through the arcuate path between the retracted position and the extended position;

wherein, with the mounting arm attached at the side of the vehicle, and with the mirror head at the retracted position or at the extended position, the driving link is pivoted in a first direction relative to the first pivot link to move the receiver relative to the first pivot link; and wherein pivoting of the driving link in the first direction relative to the first pivot link causes the receiver to engage the locking arm at the mounting arm to move the locking arm into engagement with the mirror head to retain the mirror head in the respective retracted position or extended position.

17. The vehicular exterior rearview mirror assembly of claim 16, wherein, with the mounting arm attached at the side of the vehicle, and with the mirror head retained in the retracted position or the extended position via the locking arm being engaged with the mirror head, pivotal movement of the driving link in a second direction that is opposite from the first direction, disengages the portion of the locking mechanism from the locking arm, allowing the locking arm to move out of engagement with the mirror head.

18. The vehicular exterior rearview mirror assembly of claim 16, wherein, with the mounting arm attached at the side of the vehicle, and as the mirror head is moved between the retracted position and the extended position, the portion of the first pivot link is maintained at a center region of the receiver by the first and second biasing elements.

19. The vehicular exterior rearview mirror assembly of claim 18, wherein the pivoting of the driving link relative to the first pivot link moves the receiver relative to the first pivot link due to compression of the first biasing element or the second biasing element.

20. The vehicular exterior rearview mirror assembly of claim 16, wherein the driving link comprises a tab that, with the mounting arm attached at the side of the vehicle, is movable by a user to move the locking arm out of engagement with the mirror head to release the mirror head from the retracted position or the extended position, and wherein the tab is exposed exterior the mirror head and is movably received along an arcuate slot of a mirror casing of the mirror head.

21. The vehicular exterior rearview mirror assembly of claim 16, wherein the electrically operated motor operates to pivot the first pivot link relative to the mounting arm via moving the driving link.

22. A vehicular exterior rearview mirror assembly, the vehicular exterior rearview mirror assembly comprising:
- a mirror head, the mirror head accommodating a mirror reflective element;
- a mounting arm configured for attachment at a side of a vehicle;
- wherein the mirror head is adjustably mounted at the mounting arm via a pivot link, and wherein the pivot link comprises (i) a first end that pivotally attaches at the mirror head and (ii) a second end that pivotally attaches at the mounting arm;
- wherein, with the mounting arm attached at the side of the vehicle, the mirror head is movable relative to the mounting arm between a retracted position and an extended position, and wherein the mirror head is closer to the side of the vehicle at which the mounting arm is attached when in the retracted position as compared to when the mirror head is in the extended position;
- a locking mechanism comprising (i) a driving link, (ii) a receiver attached to the driving link and (iii) a locking arm;
- wherein the receiver receives a portion of the pivot link, and wherein the receiver includes (i) a first biasing element disposed at a first end of the receiver and engaging a first side of the received portion of the pivot link and (ii) a second biasing element disposed at a second end of the receiver and engaging a second side of the received portion of the pivot link;
- wherein the locking arm is disposed at the mounting arm and is configured to engage the mirror head;
- wherein, with the mounting arm attached at the side of the vehicle, and when the mirror head is moved relative to the mounting arm, the receiver moves with the pivot link to move the portion of the pivot link and to pivot the pivot link and swing the mirror head along an arcuate path between the retracted position and the extended position;
- wherein, with the mounting arm attached at the side of the vehicle, and with the mirror head at the retracted position or at the extended position, the driving link is pivoted in a first direction relative to the pivot link to move the receiver relative to the pivot link;
- wherein, with the mounting arm attached at the side of the vehicle, and as the mirror head is moved between the retracted position and the extended position, the portion of the pivot link is maintained at a center region of the receiver by the first and second biasing elements;
- wherein pivoting of the driving link in the first direction relative to the pivot link causes a portion of the locking mechanism to engage the locking arm at the mounting arm to move the locking arm into engagement with the mirror head to retain the mirror head in the respective retracted position or extended position;
- wherein the pivoting of the driving link in the first direction relative to the pivot link moves the receiver relative to the pivot link due to compression of the first biasing element; and
- wherein, with the mounting arm attached at the side of the vehicle, and with the mirror head retained in the retracted position or the extended position via the locking arm being engaged with the mirror head, pivotal movement of the driving link in a second direction that is opposite from the first direction, disengages the portion of the locking mechanism from the locking arm, allowing the locking arm to move out of engagement with the mirror head.

23. The vehicular exterior rearview mirror assembly of claim 22, further comprising a second pivot link, and wherein the second pivot link comprises (i) a first end that pivotally attaches at the mirror head and (ii) a second end that pivotally attaches at the mounting arm, wherein, with the mounting arm attached at the side of the vehicle, the pivot link and the second pivot link cooperate to swing the mirror head through the arcuate path between the retracted position and the extended position.

24. The vehicular exterior rearview mirror assembly of claim 22, wherein operation of an electrically operated motor pivots the pivot link relative to the mounting arm, whereby the mirror head moves via pivotal movement of the pivot link.

25. The vehicular exterior rearview mirror assembly of claim 22, wherein the portion of the locking mechanism comprises the receiver.

* * * * *